(12) United States Patent
Moshouris et al.

(10) Patent No.: US 12,420,311 B1
(45) Date of Patent: Sep. 23, 2025

(54) ITEM CONSOLIDATOR

(71) Applicant: Amazon Technologies, Inc., Seattle, WA (US)

(72) Inventors: Emanuel Moshouris, Seattle, WA (US); Ennio Claretti, Seattle, WA (US); Emily Dunne, Arvada, CO (US); Andrew Stubbs, Seattle, WA (US); Don Frank Ruffatto, Renton, WA (US); Rachel Lynn Muhlbauer, Seattle, WA (US); Nikhil Bole, Seattle, WA (US); Mike Hector, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 798 days.

(21) Appl. No.: 17/703,765

(22) Filed: Mar. 24, 2022

(51) Int. Cl.
| | |
|---|---|
| *G06F 7/00* | (2006.01) |
| *B07C 3/08* | (2006.01) |
| *B07C 5/38* | (2006.01) |
| *B65G 1/137* | (2006.01) |
| *G06Q 10/087* | (2023.01) |

(52) U.S. Cl.
CPC .............. *B07C 5/38* (2013.01); *B07C 3/08* (2013.01); *B65G 1/1373* (2013.01); *G06Q 10/087* (2013.01); *B65G 2201/02* (2013.01); *B65G 2203/0208* (2013.01)

(58) Field of Classification Search
CPC .... B07C 5/38; B07C 3/08; B07C 1/00; B07C 3/008; B65G 1/1373; B65G 2201/02; B65G 2203/0208; B65G 11/00; G06Q 10/087
USPC .................. 700/210–220, 223, 228, 230
See application file for complete search history.

(56) References Cited

U.S. PATENT DOCUMENTS

2022/0307206 A1* 9/2022 Kappel .................. E01C 19/48

* cited by examiner

*Primary Examiner* — Yolanda R Cumbess
(74) *Attorney, Agent, or Firm* — Eversheds Sutherland (US) LLP

(57) ABSTRACT

Item consolidation tools are described. In one example, an item consolidator includes first and second bay doors, a door displacement system, and a controller. The door displacement system includes first and second drive systems secured to the undersides of the first and second bay doors. The drive systems provide angular and a lateral degrees of freedom, to move the first and second bay doors. The controller is configured to direct the door displacement system to form a bay door vertex between leading edges of the bay doors. Items can be placed on the doors and will rest at the vertex between the doors. The controller can also determine drop locations for the items. The controller can then direct the door displacement system to reposition the bay door vertex based on the drop locations and drop the items by opening or retracting the doors.

19 Claims, 10 Drawing Sheets

ITEM CONSOLIDATOR

BACKGROUND

Thousands of items, articles, or products can be stored at materials handling facilities. These items can be stored at many different locations in the materials handling facilities. When an order for a group of the items is received, it is necessary to gather all the items together to complete or fill the order. To that end, a number of items can be picked and transported along conveyors in trays, bins, cartons, or other containers for consolidation. The items can be organized or consolidated into groups of items that fulfill the order, for example, or for other reasons.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

As noted above, thousands of items, articles, or products can be stored at materials handling facilities. When an order for a group of the items is received, it is necessary to gather all the items together to complete or fill the order. To that end, a number of items can be picked and transported along conveyors in trays, bins, cartons, or other containers for consolidation. The items can be organized or consolidated into groups of items that fulfill the order, for example, or for other reasons.

Additionally, more and more items are being shipped by carriers to consumers. Thus, it has become more important to bring efficiency to the distribution chains through which these items are being transported. Additionally, it has become important to carefully track and monitor the schedules by which these items are consolidated and transported, to ensure compliance with the expectations of and commitments to the consumers. Because a great number of items are processed at and pass through materials handling facilities and sort centers, it would be helpful to further automate the transportation and consolidation of the materials handling processes in these facilities.

A number of different systems have been developed to help automate the consolidation of items in a materials handling facility or sort center. Conveyor systems, robotic automation machines, vacuum and gripping systems, and other systems have been designed to provide increased productivity through the automation of materials handling tasks. These systems are also particularly well-suited for dangerous, caustic, and extreme environments, where individuals are subject to discomfort or bodily harm.

Various aspects of new item consolidation tools are described. In one example, an item consolidator includes first and second bay doors, a door displacement system, and a controller. The door displacement system includes first and second drive systems secured to the undersides of the first and second bay doors. The drive systems provide angular and a lateral degrees of freedom, to move the first and second bay doors. The controller is configured to direct the door displacement system to form a bay door vertex between leading edges of the bay doors. Items can be placed on the doors and will rest at the vertex between the doors. The controller can also determine drop locations for the items. The controller can then direct the door displacement system to reposition the bay door vertex based on the drop locations and drop the items by opening or retracting the doors.

Figure 1:
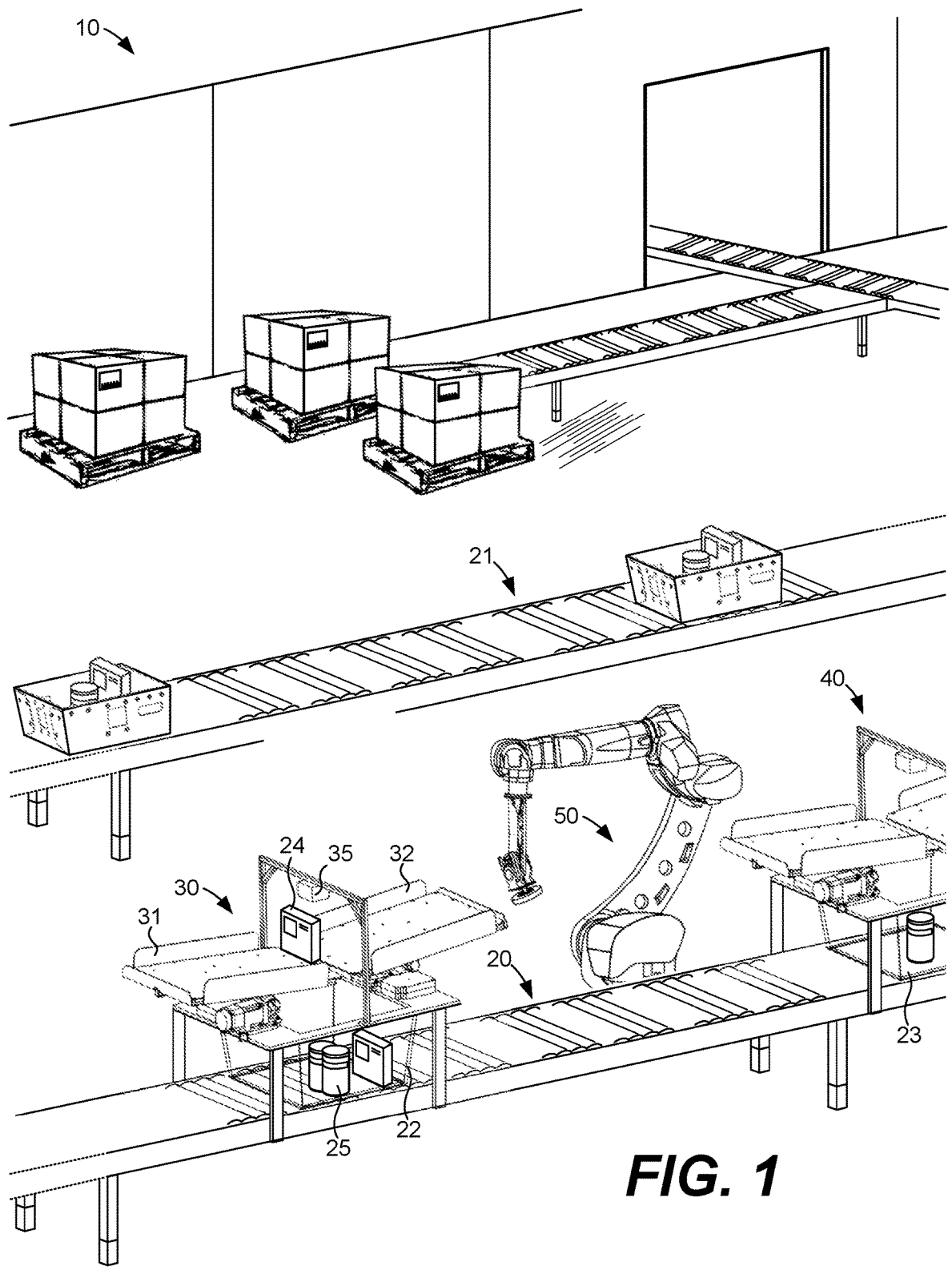
FIG. 1 illustrates an example materials handling facility according to various aspects of the embodiments of the present disclosure.

In the context outlined above, FIG. 1 illustrates an example materials handling facility 10 according to various aspects of the embodiments. Among other systems and components, the materials handling facility 10 includes a conveyor system 20, a conveyor system 21, a first item consolidator 30, a second item consolidator 40, and a robotic arm 50. In the example shown, the bins or trays 22 and 23 are moving along the conveyor system 20, similar to the way bins or trays are moving along the conveyor system 21. Only the outlines of the trays 22 and 23 are shown in FIG. 1 (i.e., they appear transparent), so that items within the trays 22 and 23 can be seen.

The materials handling facility 10 is provided as an example environment or facility in which one or more item consolidators, such as the item consolidators 30 and 40, can be implemented to automate materials handling tasks. The materials handling facility 10 can include several other automation tools and systems that are not shown in FIG. 1, such as other materials handling tools and systems, conveyor systems, chutes, robotic automation systems, vacuum and gripping systems, and other systems. In practice, the item consolidation tools and systems described herein can be implemented at various locations within a facility. For example, the item consolidators 30 and 40, among others, can be located at other positions within the materials handling facility 10 in other cases.

The item consolidators 30 and 40, as shown in FIG. 1, are representative examples of the automation tools described herein. The item consolidators 30 and 40 can be embodied as any of the example item consolidators described below in connection with FIGS. 2, 3A, 3B, and 4. Among other uses, the item consolidators 30 and 40 can be relied upon to consolidate items into bins or trays, as part of item consolidation for packing and shipping orders of items from the materials handling facility 10. The item consolidators 30 and 40 can also be used in other types of materials handling environments and for other purposes as compared to the examples described herein.

The item consolidators 30 and 40 are positioned along the conveyor system 20 and are capable of depositing and consolidating items into the trays 22 and 23, respectively. For example, the item consolidator 30 is capable of consolidating the item 24 into the tray 22, along with the item 25. As described in further detail below, the item consolidator 30 can determine a certain position to drop or place the item 24 into the tray 22, based on a number of factors, such as the positions of the item 25 in the tray 22, the size and shape of the item 24, and other factors and information.

The item consolidator 30 includes a first bay door 31, a second bay door 32, and an imaging system 35. Through the coordinated movement of the first bay door 31 and the second bay door 32, the item consolidator 30 can reposition the item 24 over the tray 22. As shown in FIG. 1, the item 24 is resting at a bay door vertex between the bay doors 31 and 32, at a location proximate to the center of the tray 22. From this position, the bay doors 31 and 32 can move laterally to the right, laterally to the right, pivot down, pivot up, and make other movements. The bay doors 31 and 32 can move in a coordinated way, together, or the bay doors 31 and 32 can move separately and in different directions. A door displacement system, which is described in further detail below, can be relied upon to reposition the bay doors 31 and 32 in these and other ways.

In addition to repositioning the item 24 over the tray 22, the item consolidator 30 can also drop or place the item 24 into the tray 22. Using feedback gathered from the imaging system 35, for example, the item consolidator 30 can examine and map the contents of the tray 22. The item consolidator 30 can also determine or select a position to place the item 24 in the tray 22 based on the other contents in the tray 22, with reference to the map of contents. Using that information, the item consolidator 30 can place the item 24 in the tray 22 next to the item 25, so that the item 24 does not stack on top of the item 25.

To place the item 24 next to the item 25 in the tray 22, the item consolidator 30 can first reposition the item 24 to the side of the item 25, above the tray 22. The item consolidator 30 can move or slide both the bay doors 31 and 32 laterally in the same direction, together, to shift the item 24 to one side of the item 25. Then, the item consolidator 30 can retract and open the bay doors 31 and 32 by moving them laterally, in opposite directions away from each other. The item 24 will then fall between the bay doors 31 and 32 and into the tray 22 when the bay doors 31 and 32 are opened. Alternatively, before opening them, the bay doors 31 and 32 can be pivoted and lowered down into the tray 22, lowering the item 24 into the tray 22, before opening the bay doors 31 and 32. The item consolidator 30 can also place the item 24 at other suitable locations in the tray 22 based on other factors or considerations, as described herein. The item consolidator 30 is capable of these and other item positioning and placement actions, to help consolidate items into trays or bins. One or more drive systems of the item consolidator 30 can be relied upon to move the bay doors 31 and 32 for item placement, and those systems are described in further detail below.

The item consolidators 30 and 40 are one example of automation tools, among potentially several others, that can be relied upon in the materials handling facility 10 to consolidate items and perform other materials handling tasks. Items can be placed on the item consolidators 30 and 40 by one or more individuals, conveyor systems, chutes, robotic automation systems, vacuum and gripping systems, and other automation systems and machines. As one example, items can be placed on the item consolidators 30 and 40 by the robotic arm 50. The robotic arm 50 can move items from trays travelling along the conveyor system 21 and place them onto the item consolidators 30 and 40. The item consolidators 30 and 40 offer an alternative tool for consolidating items into bins or trays, as compared to the robotic arm 50, for example. The item consolidators 30 and 40 offer certain advantages over other systems for item consolidation, such as faster speed, better item placement fidelity or accuracy, lower cost, and other benefits. Additional operational aspects, features, and benefits of item consolidators according to the embodiments are described in further detail below.

Figure 2:
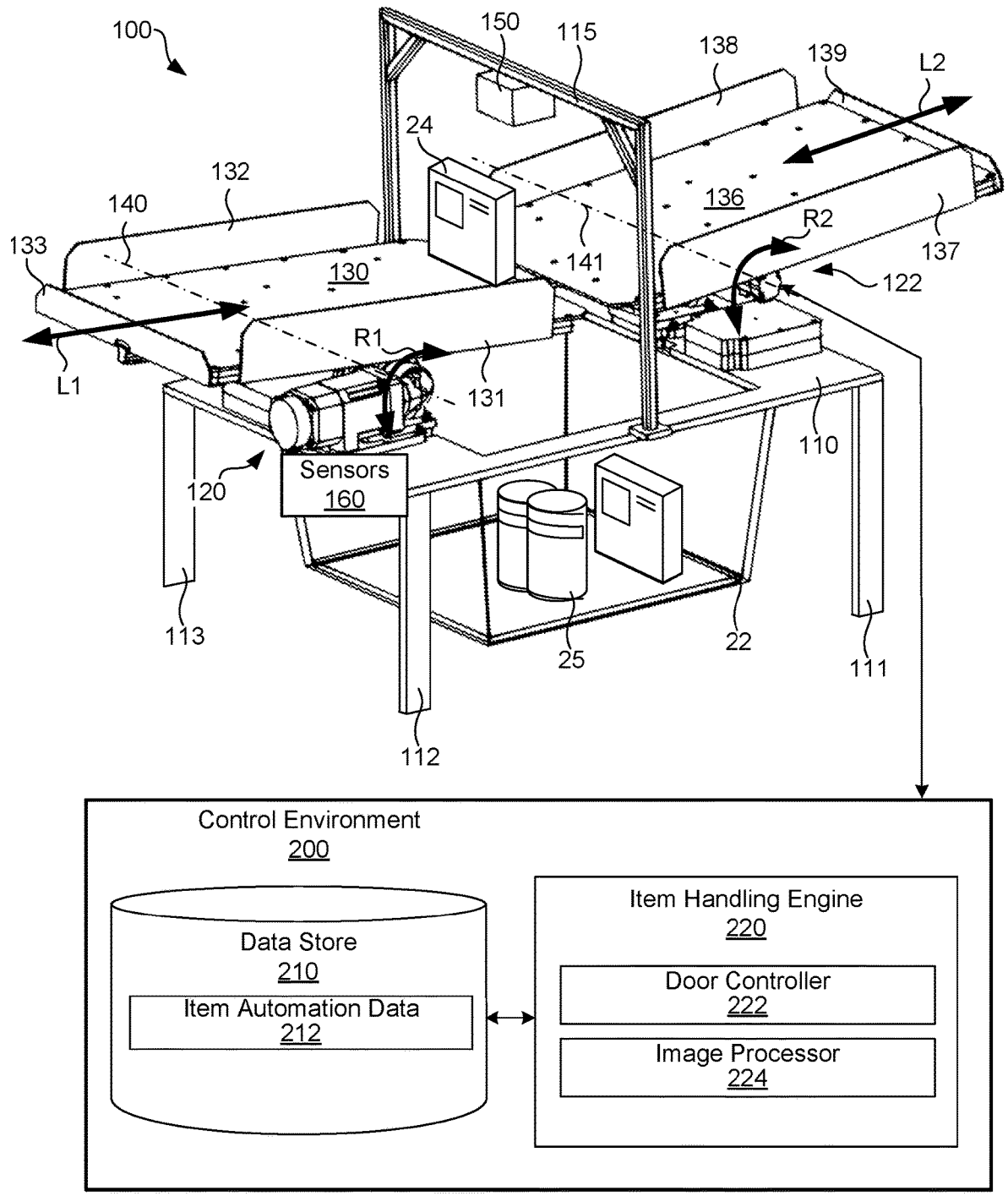
FIG. 2 illustrates an item consolidator and control environment according to various aspects of the embodiments of the present disclosure.

FIG. 2 illustrates an item consolidator 100, a control environment 200, and an imaging system 150 according to various aspects of the embodiments of the present disclosure. The item consolidator 100 is provided as a representative example in FIG. 2. The item consolidator 100 is not necessarily drawn to any scale or size, and the relative sizes, shapes, and positions of the components of the item consolidator 100 can vary as compared to that shown. The item consolidator 100 can also be modified as compared to that shown, for the purpose of integration with a variety of systems in materials handling facilities, including conveyor systems, robotic pick and place automation machines, transport robots, and other systems.

Among other components, the item consolidator 100 includes a support platform 110, support braces 111-113, a support frame 115, a displacement system including a first drive system 120 and a second drive system 122, a first bay door 130, a second bay door 136, an imaging system 150, and sensors 160. The support platform 110 provides a platform upon which the first drive system 120, the second drive system 122, the first bay door 130, the second bay door 136, and the support frame 115 are supported. In the example shown, the support platform 110 is itself supported by the braces 111-113, which can be mounted to a conveyor system, such as the conveyor system 20 shown in FIG. 1, for example. It is not necessary for the item consolidator 100 to be used or positioned over a conveyor system in all cases, however, as the item consolidator 100 can be used in other locations and scenarios.

The braces 111-113 elevate the support platform 110, so that the tray 22 or another container can be positioned below an opening or aperture formed through the support platform 110. The item consolidator 100 can consolidate items into the tray 22 by dropping them through the opening in the support platform 110. The support platform 110 can also be secured or positioned in other ways, with or without the braces 111-113. The braces 111-113 and support platform 110 can be formed from any suitable materials, such as aluminum or other metals, plastics, wood, or other suitable materials capable of supporting the drive system 120, drive system 122, bay door 130, and bay door 136.

The drive system 120, drive system 122, bay door 130, and bay door 136 each includes an assembly of parts or components, as described in further detail below. The drive system 120 is mechanically secured to an underside of the first bay door 130. The drive system 120 provides an angular moment or degree of freedom 140 for the first bay door 130, shown as "R1" in FIG. 2. The drive system 120 also provides a lateral degree of freedom to the first bay door 130, shown as "L1." Similarly, the drive system 122 is mechanically secured to an underside of the second bay door 136. The drive system 122 provides an angular moment or degree of freedom 141 to the second bay door 130, shown as "R2" in FIG. 2. The drive system 122 also provides a lateral degree of freedom to the second bay door 136, shown as "L2." The form and capabilities of the drive systems 120 and 122 are described in further detail below with reference to FIGS. 3A, 3B, and 4.

The bay door 130 can be embodied as a planar door, surface, or plate. The bay door 130 can be formed from any suitable materials, including metals, plastics, carbon fiber and other composites, wood, or other materials. The top surface of the bay door 130 can be covered or augmented in some cases to exhibit a level of friction. A thin sheet of rubber or foam of, for example, can be adhered to the top surface of the bay door 130, to help prevent items from slipping or sliding along the bay door 130. The bay door 136 can be similar to the bay door 130 and have a top surface that exhibits an amount of friction. In other cases, the top surfaces of the bay doors 130 and 136 can be intentionally designed for low friction. In this case, the item consolidator 100 can operate to slide items along the bay door 130, the bay door 136, or both, so that the items can ultimately slide into to a bay door vertex formed between leading edges of the bay doors 130 and 136 as described herein.

The bay door 130 can be embodied as a planar door, surface, or plate of suitable dimensions with respect to the tray 22. For lowering and dropping items into the tray 22, the width "W" (see FIG. 3B) of the bay door 130 can be smaller than that of the aperture in the support platform 110, so that the bay door 130 can fit through the aperture with a clearance on all sides. The width of the bay door 130 can also be smaller than the top opening of the tray 22 so as to fit within the tray 22. The length "L" (see FIG. 3B) of the bay door 130 can be long enough to extend down into the tray 22, from above, to a sufficient distance for dropping items into the tray 22. The bay door 136 can also be embodied as a planar door, surface, or plate of dimensions similar to those of the bay door 130.

In the example shown in FIG. 2, the bay door 130 includes a first sidewall 131, a second sidewall 132, and a backwall 133. The bay door 136 includes a first sidewall 137, a second sidewall 138, and a backwall 139. The sidewalls 131, 132, 137, and 138 and backwalls 133 and 139 can help prevent items from inadvertently falling or sliding off of the bay doors 130 and 136. The sidewalls 131, 132, 137, and 138 and backwalls 133 and 139 can be formed to any suitable size and from any suitable materials. The sidewalls 131, 132, 137, and 138 and backwalls 133 and 139 can be secured around the peripheral edges of the bay doors 130 and 136 using mechanical fasteners (e.g., screws, bolts, nuts, pins, rivets, etc.), welds, adhesives, mechanical interferences, and other means of suitable strength.

The imaging system 150 can be embodied as one or more cameras, radar ranging systems, light detection and ranging (LIDAR) systems, optical sensors, and other sensors and systems that provide the data needed for computer-based image and vision processing. As one example, the imaging system 150 can include one or more charge-coupled device (CCD) image sensors, active-pixel complimentary metal-oxide semiconductor (CMOS) image sensors, or other image sensors capable of capturing images. The data captured by the imaging system 150 can be stored and processed by the control environment 200, as described below. The control environment 200 can use the data, in part, to direct the operations of the item consolidator 100.

The position of the imaging system 150 is provided as a representative example in FIG. 2, as the imaging system 150 can be located at other locations or positions around the item consolidator 100. Cameras or other imaging devices of the imaging system 150, for example, can be positioned to facilitate the best view of items contained within the tray 22. The cameras can also be positioned to capture images of the bay doors 130 and 136 and items resting on the bay doors 130 and 136. In some cases, the imaging system 150 can be embodied as an array of cameras and other imaging devices, positioned around the item consolidator 100, to ensure that sufficient and accurate image data is captured for control of the item consolidator 100. As one example, one or more imaging or ranging devices can be installed under one or both of the bay doors 130 and 136, to confirm the positions and orientations of the bay doors 130 and 136.

The control environment 200 can be embodied as a control system for the item consolidator 100, including one or more processors, processing devices, circuits, and memory devices. The control environment 200 can be implemented using a combination of hardware and software, for example, as described in further detail below with reference to FIG. 8. The control environment 200 can be implemented as an embedded control system of the item consolidator 100 itself (e.g., a programmable logic controller (PLC) of the item consolidator 100), implemented separate from the item consolidator 100, or be embodied as a hybrid of local and remote processing systems. The control environment 200 can also interface with the item consolidator 100 in any suitable way, such as through one or more local interfaces, network interfaces, or other suitable interfaces. The control environment 200 can also include one or more network interfaces, such as wired and wireless network interfaces, for data communications with other computing systems and environments over private and public networks.

The control environment 200 is configured to direct the overall operation of the item consolidator 100 in the automated handling of items. In that sense, the control environment 200 is configured to direct the operation of the drive system 100C to move and reposition the bay doors 130 and 136, among other operational aspects of the item consolidator 100 described herein. In some cases, the control environment 200 can coordinate the operation of other item consolidators in addition to the item consolidator 100. The control environment 200 can also be configured to direct the operation of the imaging system 150, among other systems.

The control environment 200 includes a data store 210 and an item handling engine 220. The data store 210 can store operational data for the item consolidator 100, including data processed by the item handling engine 220. For example, the data store 210 can also store item automation data 212, among other types of data. The item automation data 212 can include data related to items being handled at the materials handling facility 10 in FIG. 1, such as item description data, item identification data (e.g., barcode, serial number, model number, sales price, and related data), item quality data (e.g., size, weight, hazardous materials, and other data), and other information.

The item automation data 212 can also include images of the items being handled and consolidated, along with routing, consolidation, and order data, and any other data relevant to the automation processes being performed by the item consolidator 100. The data store 210 can also store images captured by the imaging system 150 for image analysis and processing. The data store 210 can also store map data, including data representative of the internal contents of trays or bins in which items are being consolidated. Thus, the map data generated by the image processor 224 can be stored in the data store 210, as described below.

The item handling engine 220 includes a door controller 222 and an image processor 224. The door controller 222 is configured to monitor the operational conditions and state of the item consolidator 100 and direct the drive systems 120 and 122 to control the positions and orientations of the bay doors 130 and 136 for item handling and consolidation, among other operational aspects. To that end, the door controller 222 can incorporate control algorithms suitable to direct the operation of the drive systems 120 and 122. Those algorithms can be relied upon to control motor drive systems, pneumatic drive systems, and other drive systems in the item consolidator 100. As examples, the door controller 222 can incorporate proportional-integral (PI) or proportional-integral-derivative (PID) control loop systems or algorithms employing feedback, among other suitable control approaches.

The door controller 222 can use data provided from the sensors 160, which are described in further detail below, to help direct the operations of the item consolidator 100. For example, the sensors 160 can provide control signals to identify the relative or absolute positions of the bay doors 130 and 136 at a particular time or over time. The sensors 160 can also identify the speed at which the bay doors 130 and 136 are moving and other operational conditions of the item consolidator 100. The door controller 222 can also reference data stored in the data store 210, such as data that defines the size and shape of the trays or bins into which items are being consolidated, map data that identifies the contents of the trays or bins, and other data.

The sensors 160 can be embodied as one or more optical sensors, interference sensors, position encoders, pressure sensors, weight or force sensors, proximity sensors, contact sensors, accelerometers, other sensors, or a combination thereof, capable of providing operational state feedback signals to the control environment 200. The sensors 160 can be integrated with or placed in, on, or around the drive systems 120 and 122, the bay doors 130 and 136, or installed at other suitable locations on the item consolidator 100. Data obtained from the feedback signals can be stored in the data store 210 for further evaluation and processing by the item handling engine 220.

As one example, the sensors 160 can include one or more pressure, contact, optical, or vision-based sensors installed in or around the bay doors 130 and 136 (including in or on the conveyor system), to detect the presence of the tray 22 under the item consolidator 100. In other examples, the sensors 160 can be embodied as position encoders that provide absolute or relative position information of the bay doors 130 and 136, respectively, for evaluation by the control environment 200. The control environment 200 can direct the operations of the item consolidator 100, at least in part, based on the operational state feedback signals provided from the sensors 160.

The image processor 224 can operate along with the door controller 222 to monitor the operating state of the item consolidator 100 and direct the operations of the item consolidator 100. The image processor 224 can direct the imaging system 150 to capture images of the content in the tray 22, such as the item 25. The image processor 224 can also perform a number of computer-based image and vision processing tasks using data captured by the imaging system 150. For example, the image processor 224 can develop a map, such as a point cloud, representative of the items contained in the tray 22. The map can identify the item 25, for example, among other items contained within the tray 22, so that the item handling engine 220 can determine a drop location for the item 24 in the tray 22. These and other operational aspects of the image processor 224 are described below. In some cases, the image processor 224 can be separate from the rest of the control environment 200, and the item handling engine 220 can be interfaced with the image processor 224 over a computer network.

Figure 3A:
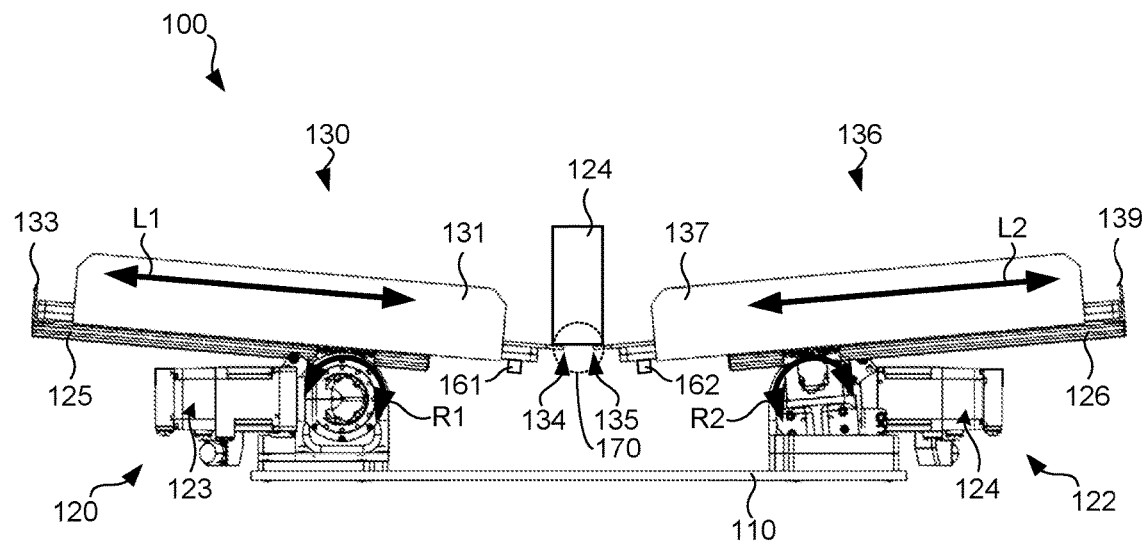
FIG. 3A illustrates a side view of the item consolidator shown in FIG. 2 according to various aspects of the embodiments of the present disclosure.
Figure 3B:
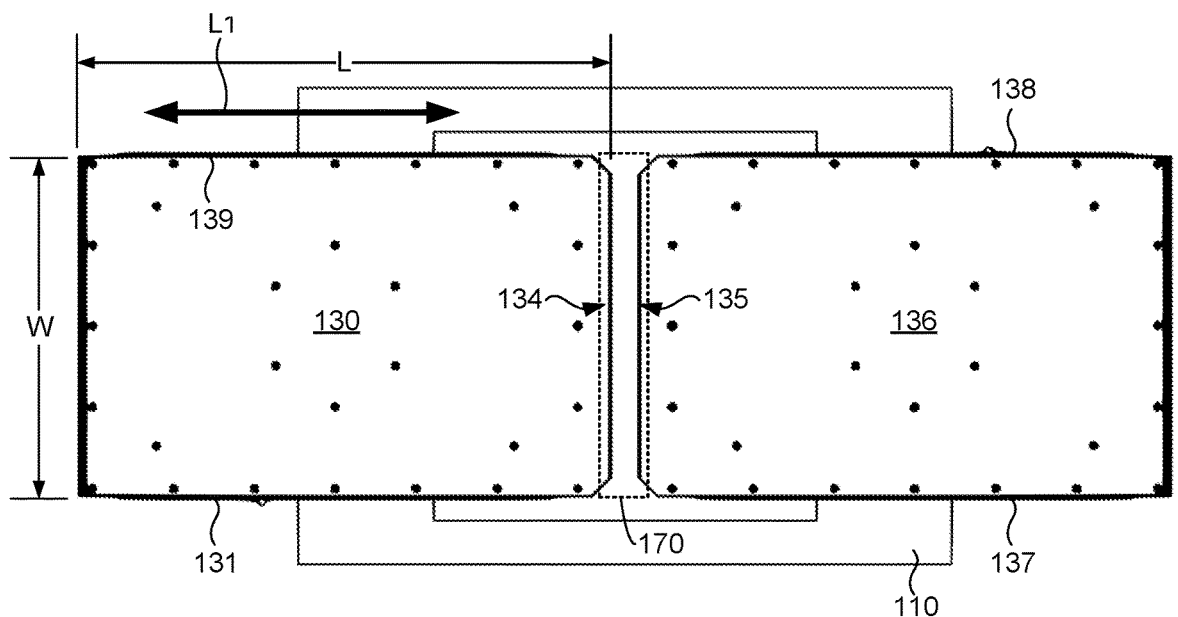
FIG. 3B illustrates a top-down view of the item consolidator shown in FIG. 2 according to various aspects of the embodiments of the present disclosure.

Turning to other aspects of the item consolidator 100, FIG. 3A illustrates a side view of the item consolidator 100, and FIG. 3B illustrates a top-down view of the item consolidator 100. The item consolidator 100 is provided as a representative example in FIGS. 3A and 3B. The item consolidator 100 is not necessarily drawn to any scale or size, and the relative sizes, shapes, and positions of the components of the item consolidator 100 can vary as compared to that shown. The item consolidator 100 can also be modified as compared to that shown, for the purpose of integration with a variety of systems in materials handling facilities, including conveyor systems, robotic pick and place automation machines, transport robots, and other systems. The item consolidator 100 can also include other components or parts that are not shown in FIGS. 3A and 3B, and the item consolidator 100 can omit one or more of the components shown.

The first drive system 120 and the second drive system 122 are visible in FIG. 3A. The first drive system 120 includes an angular drive assembly 123 and a linear drive assembly. In the example shown, the linear drive assembly includes a rack gear 125 and a rack drive engaged with the rack gear 125, but the rack drive is not visible in FIG. 3A. The linear drive assembly of the first drive system 120 is described in greater detail below with reference to FIG. 4A. The first drive system 120 is secured to an underside of the first bay door 130 through the rack gear 125. Similarly, the second drive system 122 includes an angular drive assembly 124 and a linear drive assembly. The linear drive assembly includes a rack gear 126 and a linear drive assembly. The second drive system 122 is secured to an underside of the second bay door 136 through the rack gear 126. The linear drive assembly of the second drive system 122 is also described in greater detail below with reference to FIG. 4A.

The angular drive assemblies 123 and 124 can be embodied as pneumatic, electro-mechanical, or other types of drive mechanisms. In one example, the drive assemblies 123 and 124 can be embodied as motors, with or without gearboxes, capable of rotating the bay doors 130 and 136 in the angular directions "R1" and "R2," respectively. Particularly, the drive assembly 123 can rotate the bay door 130 clockwise or counterclockwise about the angular moment or degree of freedom 140 shown in FIG. 2. Similarly, the drive assembly 124 can rotate the bay door 136 clockwise or counterclockwise about the angular moment or degree of freedom 141 shown in FIG. 2. The angular drive assemblies 123 and 124 can include position sensors, weight or force sensors, and other sensors capable of providing operational and status feedback to the item handling engine 220.

The linear drive assemblies of the drive systems 120 and 122 can move the bay doors 130 and 136 linearly or laterally in the directions "L1" and "L2." The linear drive assemblies can be embodied as hydraulic, pneumatic, electro-mechanical, or other types of linear actuators. The linear drive assemblies can be capable of converting rotary motion into linear motion using a leadscrew, ball screw, roller screw, cam, or other mechanical motion translation mechanism. In the example shown, the linear drive assemblies include the rack gears 125 and 126, which are driven respectively by rack drive motors, as described in further detail below. The door controller 222 can control the operation of the linear drive assemblies to reposition the bay doors 130 and 136.

The angular drive assemblies 123 and 124 are mechanically coupled to the linear drive assemblies of the drive systems 120 and 122, which are mechanically coupled to the bay doors 130 and 136. Thus, the angular drive assemblies 123 and 124 can alter the angular orientation of the linear drive assemblies, respectively, and the bay doors 130 and 136, as also described below with reference to FIG. 4.

The bay doors 130 and 136 include leading edges 134 and 135, respectively. In the handling of items, such as the item 24, the item handling engine 220 can direct the drive systems 120 and 122 to position the leading edges 134 and 135 of the bay doors 130 and 136 into relatively close proximity to each other, to form a bay door vertex 170, as identified in FIGS. 3A and 3B. In the operation of the item consolidator 100, the bay door vertex 170 can be formed between the leading edges 134 and 135 of the bay doors 130 and 136, with only a relatively small space or gap between them. To that end, the door controller 222 is configured to direct the drive systems 120 and 122 in a manner that maintains the bay door vertex 170 with only a relatively small space or gap between them. The small space or gap can be maintained to prevent items, such as the item 24, from falling between the bay doors 130 and 136. Examples of the bay door vertex 170 are described in further detail below with reference to FIGS. 5A-5E and 6A-6C. The item handling engine 220 can direct the drive systems 120 and 122 to reposition the leading edges 134 and 135 of the bay doors 130 and 136, together, to maintain the bay door vertex 170, while also repositioning items on the bay doors 130 and 136.

The item consolidator 100 also includes sensors 161 and 162. The sensors 161 and 162 are positioned on the undersides of the bay doors 130 and 136, respectively, as shown in FIG. 3A, although the positions are representative. The sensors 161 and 162 can be located at other positions under the bay doors 130 and 136. The sensors 161 and 162 can be embodied as cameras, radar ranging systems, light detection and ranging (LIDAR) systems, optical sensors, or other sensors. The sensors 161 and 162 are positioned to help with the identification of the leading edges 134 and 135 of the bay doors 130 and 136, respectively. Ranging and other operational state feedback signals captured by the sensors 161 and 162 can be relied upon by the door controller 222 for control of the bay doors 130 and 136 and to maintain the bay door vertex 170. Any number of sensors can be relied upon to help gather ranging and other position information for control of the bay doors 130 and 136.

In some cases, the door controller 222 can rely upon data from the sensors 161 and 162 to form and maintain a bay door vertex between leading edges of the bay doors 130 and 136. The sensors 161 and 162 can help to confirm when the leading edges of the bay doors 130 and 136 are in proximity to each other, with only a relatively small space or opening between them. The opening can range in size depending on control parameters of the door controller 222. As examples, the opening can be as small as $1/16^{th}$ of an inch or less in some cases, or as large as one inch or more. The size of the opening can also vary depending on the type (i.e., size, shape, weight, etc.) of the next item being consolidated.

The sensors 161 and 162 are not necessary in all cases, however, as the door controller 222 can also form and maintain a bay door vertex without the use of the sensors 161 and 162. For example, the door controller 222 can reference operational data received from position encoders of the bay doors 130 and 136, respectively, to maintain an awareness of the positions of the leading edges of the bay doors 130 and 136. This position information can also be evaluated by the door controller 222 along with the known size, shape, and other characteristics of the bay doors 130 and 136. The sensors 161 and 162 can be omitted in some cases if not needed for vertex maintenance and tracking.

Figure 4:
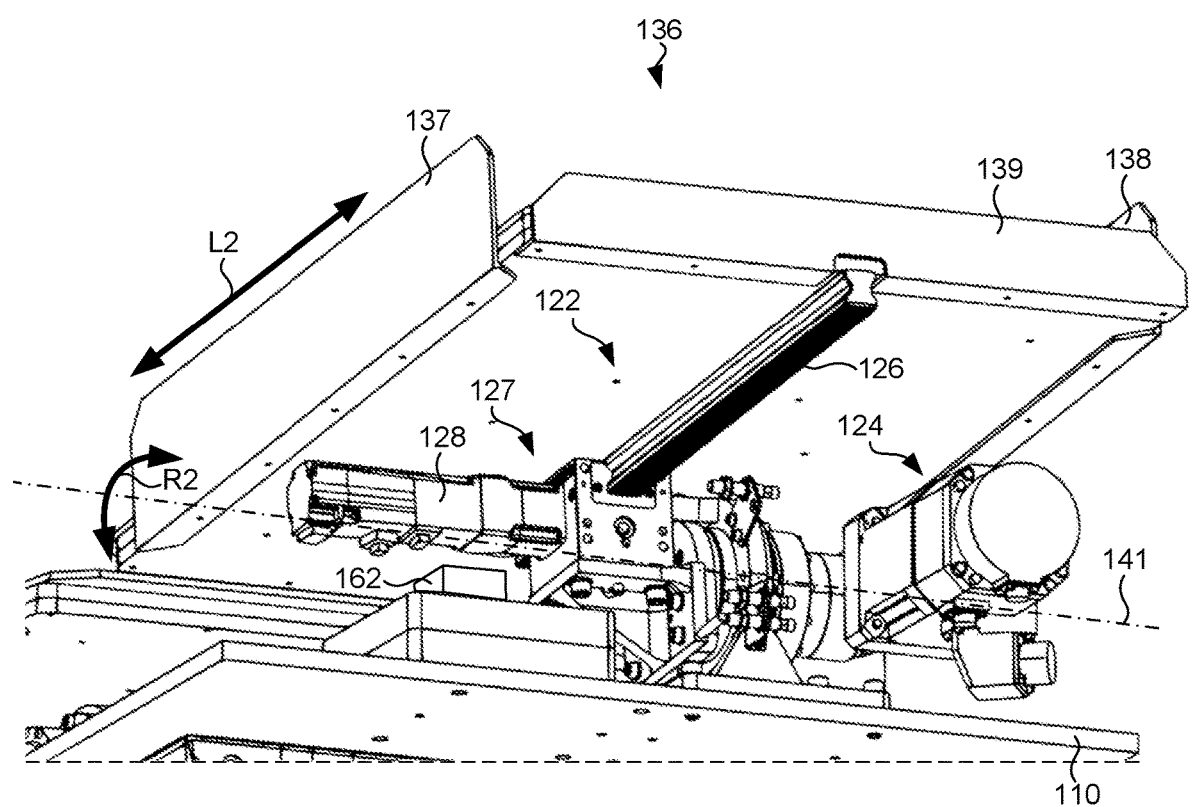
FIG. 4 illustrates an underside view of the item consolidator shown in FIG. 2 according to various aspects of the embodiments of the present disclosure.

FIG. 4 illustrates an underside view of the bay door 136 of the item consolidator 100. As shown in FIG. 4, the drive system 122 includes the angular drive assembly 124 and the linear drive assembly 127. The linear drive assembly 127 includes the rack gear 126 and a linear drive motor 128 engaged with the rack gear 126. The rack gear 126 is secured to an underside of the bay door 136, and the drive system 122 is secured to the bay door 136 by the rack gear 126. The rack gear 126 can be secured to the underside of the bay door 136 by mechanical fasteners, mechanical interferences, adhesives, or other means. Although not illustrated in FIG. 4, the drive system 120 is similar to the drive system 122, and the drive system 120 is positioned and secured under the bay door 130 similar to the way the drive system 122 is positioned and secured under the bay door 136.

As noted above, the angular drive assembly 124 can be embodied as a pneumatic, electro-mechanical, or other type of drive mechanisms. In the example shown, the drive assembly 124 can be embodied as a motor, with a gearbox, and the drive assembly 124 is mechanically coupled to the linear drive motor 128. The drive assembly 124 is capable of rotating the linear drive motor 128 in the angular direction "R2." Particularly, the drive assembly 124 can rotate the bay door 136 clockwise or counterclockwise through rotation of the linear drive assembly 127. The angular drive assembly 124 can be mounted to the support platform 110 using mechanical fasteners or other suitable means.

The linear drive assembly 127 of the drive system 122 can move the bay door 136 linearly or laterally in the direction "L2." The linear drive assembly 127 can be embodied as a hydraulic, pneumatic, electro-mechanical, or other type of linear actuator. The linear drive assembly 127 can be capable of converting rotary motion into linear motion using a leadscrew, ball screw, roller screw, cam, or other mechanical motion translation mechanism. In the example shown, the linear drive assembly 127 includes the rack gear 126, which is driven by the linear drive motor 128 to move the bay door 136. In the example shown, the linear drive motor 128 can be embodied as a motor, with a gearbox, and the linear drive motor 128 is mechanically coupled to the rack gear 126 through a pinion gear, for example, in the gearbox of the linear drive motor 128. Other mechanical arrangements can be relied upon by the linear drive assembly 127 to provide linear motion to the bay door 136. The door controller 222 can control the operation of the linear drive assembly 127 to reposition the bay door 136 as described herein.

Figure 5A:
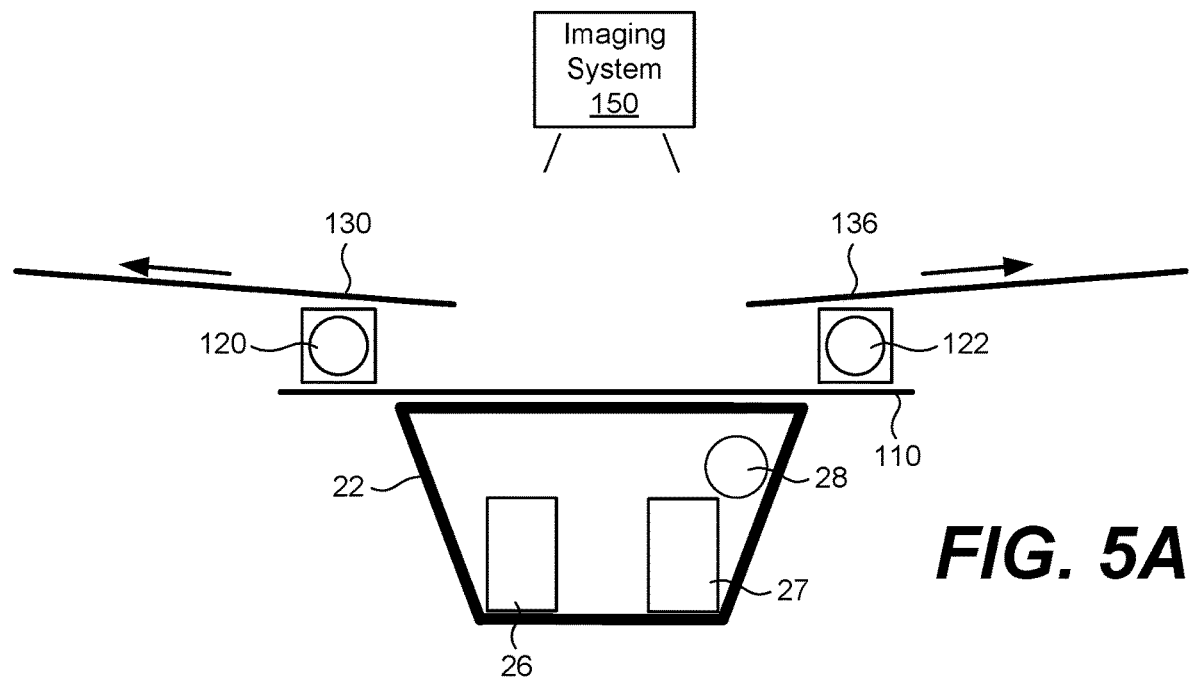
FIGS. 5A-5E illustrate an example control scheme for consolidating items using the item consolidator shown in FIG. 2 according to various aspects of the embodiments of the present disclosure.

FIGS. 5A-5E illustrate an example control scheme for consolidating items using the item consolidator 100. FIGS. 5A-5E are provided as representative examples of the types of movements that can be achieved by the bay doors 130 and 136 of the item consolidator 100. Turning to FIG. 5A, the door controller 222 can direct the bay doors 130 and 136 to slide open laterally, as shown, so that the contents of the tray 22 can be examined using the imaging system 150. Particularly, the bay doors 130 and 136 can be extended apart and away from each other, so that the aperture through the support platform 110 is not covered or obstructed.

Once the bay doors 130 and 136 are opened, the image processor 224 can direct the imaging system 150 to capture images of the content in the tray 22, such as the items 26-28. The data captured by the imaging system 150 can be stored in the data store 210 for processing by the image processor 224. The image processor 224 can also perform a number of computer-based image and vision processing tasks using the data captured by the imaging system 150. For example, the image processor 224 can develop a map, such as a point cloud, representative of the items 26-28 contained in the tray 22. The map can identify the items 26-28, among other items contained within the tray 22, so that the item handling engine 220 can determine one or more suitable drop locations in the tray 22. The image processor 224 can store the map data for the tray 22, among map data for other trays, in the data store 210 for processing by the item handling engine 220.

The process of opening the bay doors 130 and 136 to map the content of the tray 22 can occur each time a new item is being consolidated within the tray 22, as needed. This mapping process can be relied upon to provide an accurate account of both the open and the occupied space within the tray 22. The item handing engine 220 can also maintain a running account of the contents in the tray 22, as items are being consolidated in the tray 22. For example, the item handling engine 220 can modify or update the map of the content in the tray 22 each time a new item is added to the tray 22, without opening the bay doors 130 and 136. The item handling engine 220 can reference the item automation data 212 for that purpose, as the data can include the relative shape and size of each item being consolidated. Thus, the map can be updated to account for the shape and size of each item being placed in the tray 22, along with a relative position of that item within the map, even without the imaging system 150 examining the contents of the tray 22.

With reference to the map, the item handling engine 220 can be configured to consolidate items in the tray 22 without piling or stacking too many items on top of each other. For example, one object of the item handling engine 220 can be to avoid consolidating items in any manner that would result in items extending out and above the tray 22. Another object of the item handling engine 220 can be to consolidate items without damaging them. In that sense, the item handling engine 220 can reference the item automation data 212, to identify shapes, sizes, weights, and other characteristics or parameters of items being consolidated. Those parameters or factors can be relied upon when determining where items should be placed into the tray 22. The item handling engine 220 can also account for other factors or considerations when consolidating items into trays.

Figure 5B:
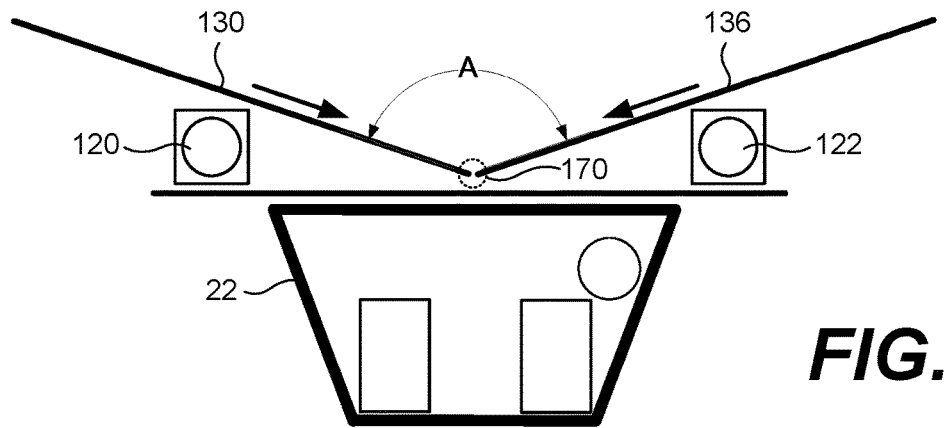

Based on the map of the items 26-28 in the tray 22, among other data, the item handling engine 220 can determine a drop location for additional items in the tray 22. To prepare for dropping additional items, the door controller 222 can reposition the bay doors 130 and 136 as shown in FIG. 5B. Particularly, the bay doors 130 and 136 can be moved laterally into position close together, so that the leading edges of the bay doors 130 and 136 are located in close proximity to each other, with only a relatively small opening between them. The opening can range in size depending on the control parameters of the door controller 222. As examples, the opening can be as small as $\frac{1}{16}^{th}$ of an inch or less in some cases, or as large as one inch or more. The size of the opening can also vary depending on the type (i.e., size, shape, weight, etc.) of the next item being consolidated.

As shown in FIG. 5B, the bay door vertex 170 is formed between the leading edges of the bay doors 130 and 136 when they are located in close proximity to each other. An angle "A" exists between the top surfaces of the bay doors 130 and 136 in this configuration. As the door controller 222 continues to move and reposition the bay doors 130 and 136, the bay door vertex 170 can be repositioned. Additionally, the angle "A" can vary depending upon the relative positions and angles of the bay doors 130 and 136. Generally, the door controller 222 maintains the size of the opening in the bay door vertex 170 to be relatively small, by maintaining the leading edges of the bay doors 130 and 136 in close proximity and within a certain distance of each other, as the bay doors 130 and 136 are repositioned in coordination with each other. The opening can range in size depending on control parameters of the door controller 222. As examples, the opening can be as small as $\frac{1}{16}^{th}$ of an inch or less in some cases, or as large as one inch or more. The size of the opening can also vary depending on the type (i.e., size, shape, weight, etc.) of the next item being consolidated. Once an item is placed upon the bay doors 130 and 136, the item can be placed at or around the bay door vertex 170, as described below. Alternatively, the item can be placed toward an end of one of the bay doors 130 and 136, and the bay doors 130 and 136 can be tilted into an angle, causing the item to slide down toward and into the bay door vertex 170, where it will rest.

Figure 5C:
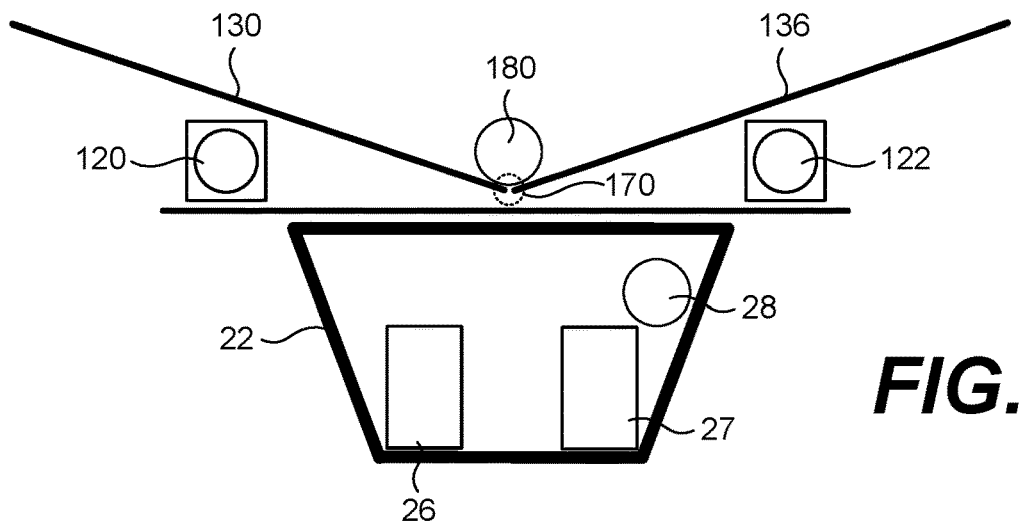
Figure 5D:
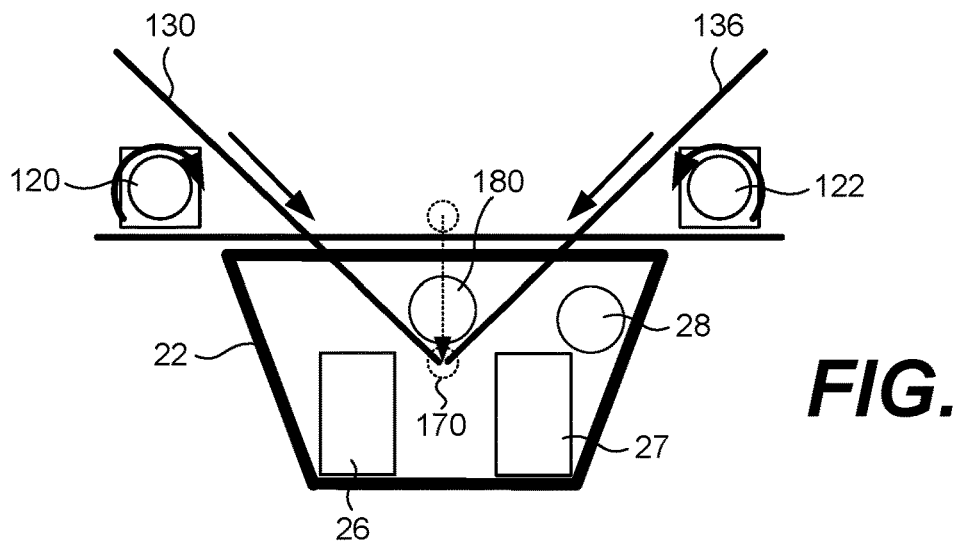
Figure 5E:
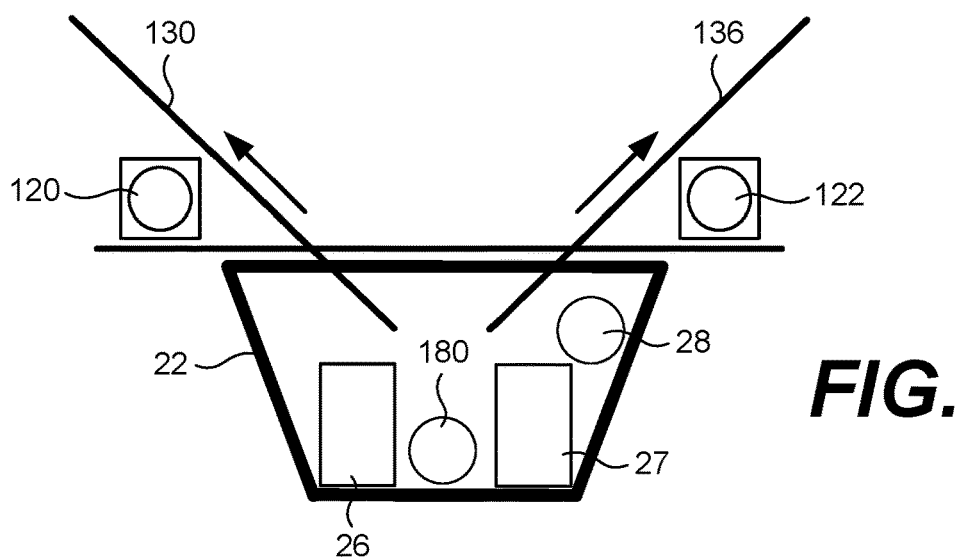

Turning to FIG. 5C, an example item 180 is placed on the bay doors 130 and 136, over the bay door vertex 170. Assuming the item handling engine 220 has determined to drop the item 180 to a position between the items 26 and 27, the door controller 222 can direct the drive systems 120 and 122 to laterally extend and angle the bay doors 130 and 136, as shown in FIG. 5D. The drive systems 120 and 122 can be coordinated to angle the bay doors 130 and 136 down, through angular motion of the bay doors 130 and 136, while at the same time extending the bay doors 130 and 136 laterally into the tray 22. In effect, this control lowers the item 180 down into the tray 22, and the bay door vertex 170 drops in position as shown. This motion can be preferable as compared to simply retracting or opening the bay doors 130 and 136 from the position shown in FIG. 5C, as a way to avoid damage to the item 180. Turning to FIG. 5E, the item handling engine 220 can now retract or open the bay doors 130 and 136, permitting the item 180 to drop down into the tray 22.

The movement of the bay doors 130 and 136, as shown in FIGS. 5A-5E, is provided an example. The door controller 222 is capable of controlling the positions and angular orientations of the bay doors 130 and 136 throughout a wide range of positions. Through control of the drive systems 120 and 122, the door controller 222 can also be configured to form and maintain a bay door vertex between the bay doors 130 and 136, as the bay doors 130 and 136 are repositioned over the tray 22. The bay doors 130 and 136 can be controlled by the door controller 222, together, so that the bay door vertex is maintained, and items can rest in place at the bay door vertex, even when the bay doors 130 and 136 move.

Figure 6A:
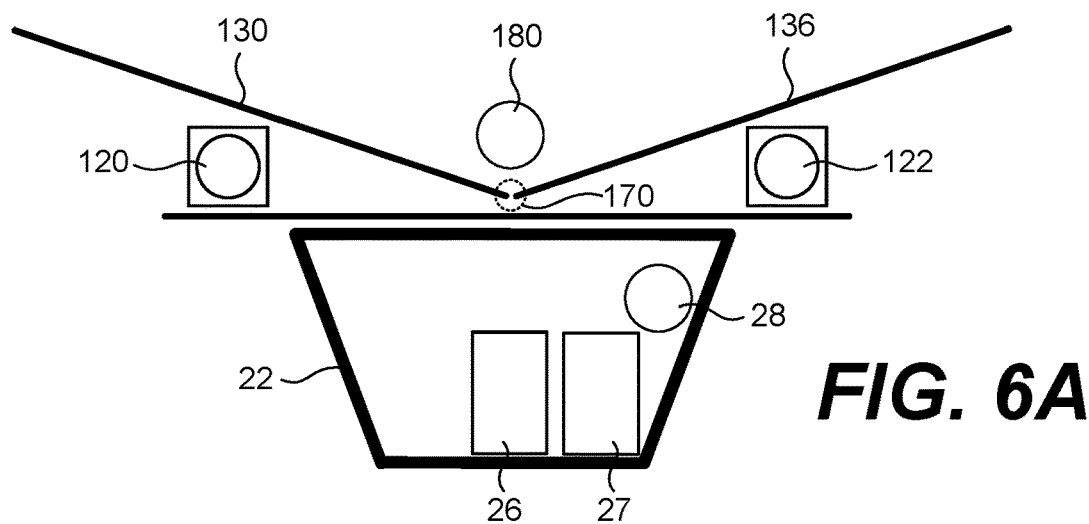
FIGS. 6A-6C illustrate another example control scheme for consolidating items using the item consolidator shown in FIG. 2 according to various aspects of the embodiments of the present disclosure.
Figure 6B:
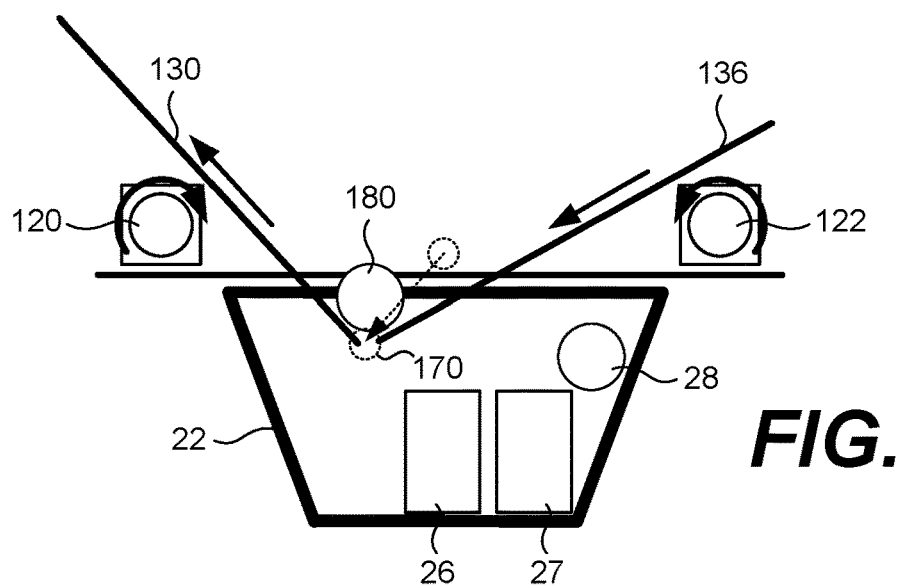
Figure 6C:
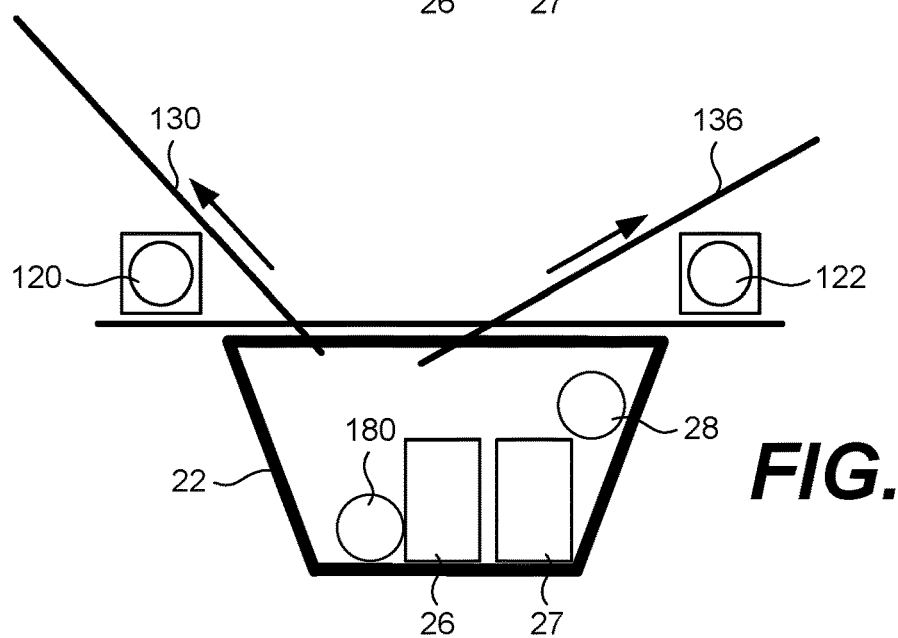

FIGS. 6A-6C illustrates s another example control scheme for consolidating items using the item consolidator 100. Turning to FIG. 6A, the item 180 is placed on the bay doors 130 and 136, over the bay door vertex 170. Assuming the item handling engine 220 has determined to drop the item 180 to a position at the left of the item 26, the door controller 222 can direct the drive systems 120 and 122 to laterally shift and angle the bay doors 130 and 136, as shown in FIG. 6B. The drive systems 120 and 122 can be coordinated to angle the bay doors 130 and 136 down, through angular motion of the bay doors 130 and 136, while at the same time laterally shifting the bay doors 130 and 136. Particularly, the bay door 130 is angled down and shifted away from the center of the tray 22, and the bay door 136 is angled down and shifted toward and past or beyond the center of the tray 22.

This motion shown between FIGS. 6A and 6B can be relied upon to move the item 180 to the left, as shown in the example. A related, but opposite, type of motion can be relied upon to move the item 180 to the right, and other movements are within the scope of the embodiments. Turning to FIG. 6C, the item handling engine 220 can now retract or open the bay doors 130 and 136, permitting the item 180 drop down into the tray 22. Any number of items can be consolidated into the tray 22 through a sequence of movements using the bay doors 130 and 136. Between each item being consolidated, the imaging system 150 can be relied upon to map the content in the tray 22. However, it may not be necessary to map the content of the tray 22 each time another item is dropped into the tray 22, as an estimated or running map can be defined over time based on the items being consolidated.

Figure 7A:
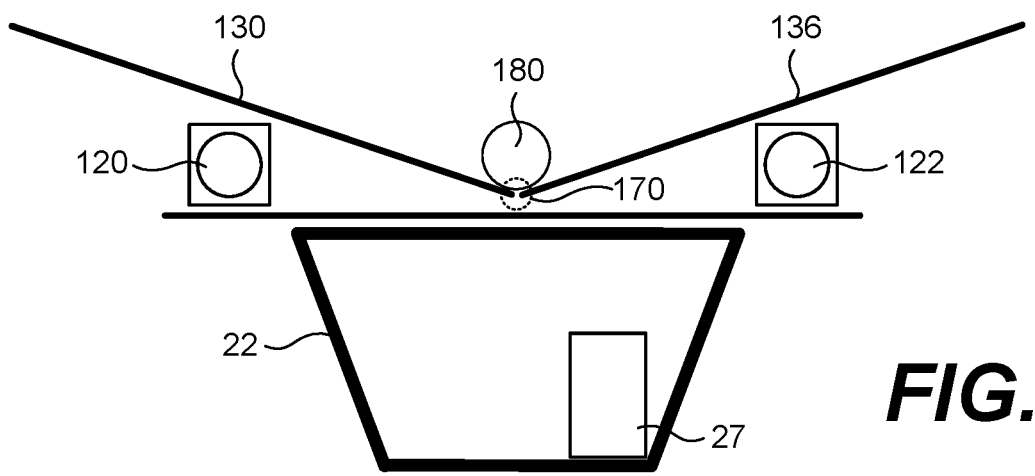
FIGS. 7A-7C illustrate another example control scheme for consolidating items using the item consolidator shown in FIG. 2 according to various aspects of the embodiments of the present disclosure.
Figure 7B:
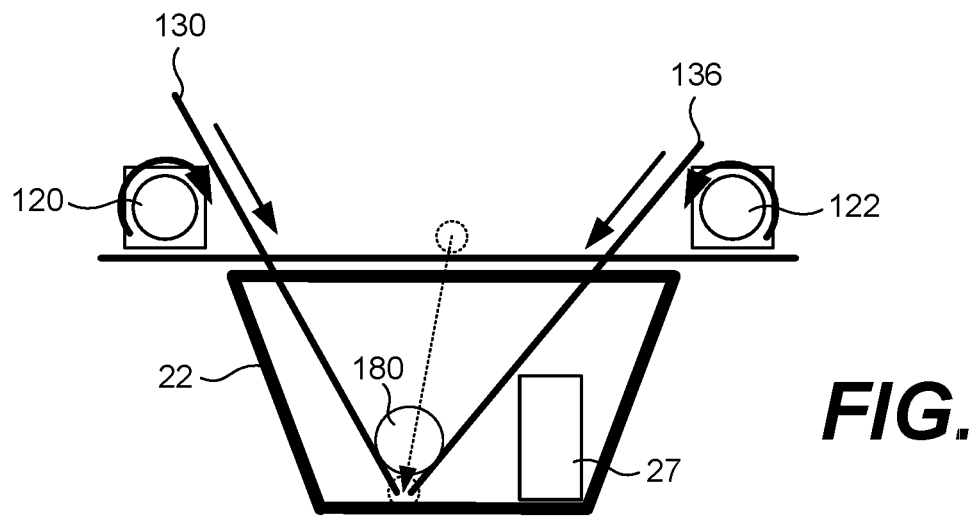
Figure 7C:
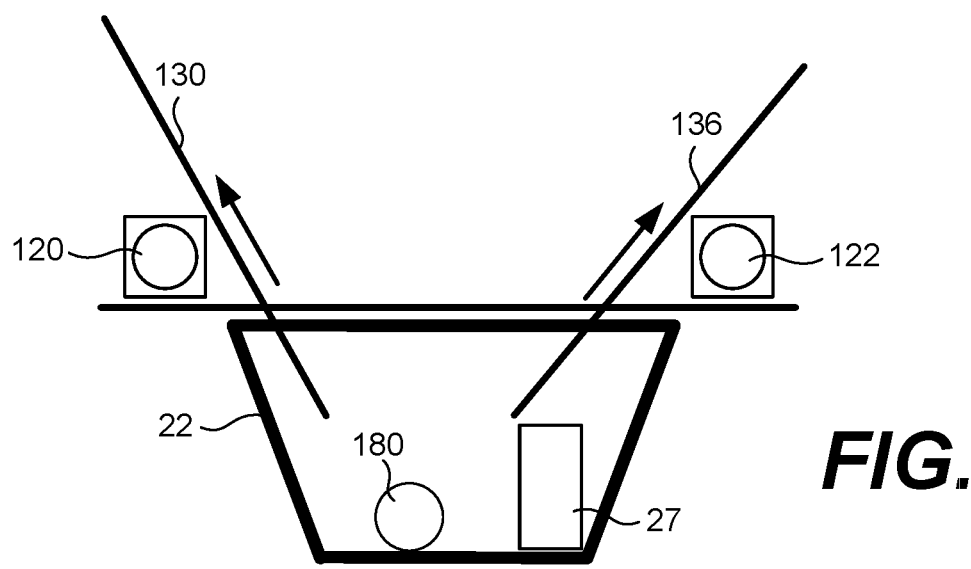

FIGS. 7A-7C illustrate another example control scheme for consolidating items using the item consolidator shown in FIG. 2 according to various aspects of the embodiments of the present disclosure. Turning to FIG. 7A, the item 180 is placed on the bay doors 130 and 136, over the bay door vertex 170. In this example, the item handling engine 220 has determined that there is sufficient clearance in the tray 22 to place the item 180 at or near the bottom of the tray 22 based on the map generated by the image processor 224. The map of the tray 22 identifies only the item 27, with the remainder of the tray 22 being free or clear of items.

The item handing engine 220 can determine based on the map that a sufficient clearance exists in the tray 22 to drop or place the item 180 at a position at or toward the bottom of the tray 22, to the left of the item 27. The item placement algorithms of the item handling engine 220 can be designed for an affinity to place items as low as possible within the tray 22, when possible, to avoid damaging items and to ensure that the position of the item is known (e.g., that it does not roll or reposition after being dropped from a higher distance). When clearance exists, the item handling engine 220 can be configured to determine a drop or placement location for the item 180 to within a very small distance, such as within $\frac{1}{16}^{th}$ of an inch or less in some cases, of the bottom of the tray 22.

The door controller 222 can then direct the drive systems 120 and 122 to laterally shift and angle the bay doors 130 and 136, as shown in FIG. 7B. The drive systems 120 and 122 can be coordinated to angle the bay doors 130 and 136 down, through angular motion of the bay doors 130 and 136, while at the same time laterally shifting the bay doors 130 and 136. The bay door 130 is angled down and shifted away from the center of the tray 22, and the bay door 136 is angled down and shifted toward and past or beyond the center of the tray 22. Additionally, both the bay doors 130 and 136 are extended laterally into the tray 22. The bay doors 130 and 136 are extended into the tray further than in the examples shown in FIGS. 5D and 6B, so that the item 180 can be positioned at or close to the bottom of the tray 22. The door controller 222 can calculate how far the bay doors 130 and 136 should be extended into the tray 22 based on the known size of the tray 22, as stored in the data store 210, among other known information. The motion shown between FIGS. 7A and 7B can be relied upon to place the item 180 with precision and without damaging it. Turning to FIG. 7C, the item handling engine 220 can now retract or open the bay doors 130 and 136, permitting the item 180 to be placed at or near the bottom of the tray 22.

Figure 8:
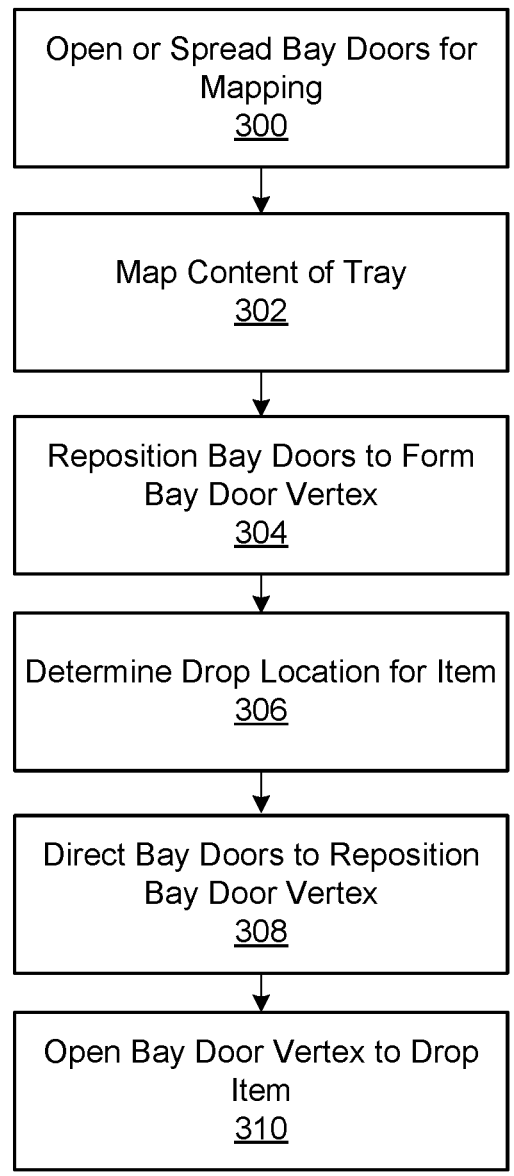
FIG. 8 illustrates an example method of consolidating items using the item consolidator shown in FIG. 2 according to various aspects of the embodiments of the present disclosure.

FIG. 8 illustrates an example method of consolidating items using the item consolidator 100 shown in FIG. 2 according to various aspects of the embodiments of the present disclosure. The process shown in FIG. 8 is described in connection with the item consolidator 100, although similar item consolidators and systems can perform the process. Although the process diagram shows an order of operation, the order can differ from that which is shown. For example, the order of two or more steps can be switched relative to the order shown or as described below. Also, two or more steps shown in succession can be executed concurrently or with partial concurrence. Further, in some examples, one or more of the steps can be skipped or omitted, and the process can continue on with additional steps for any period of time.

At step 300, the process includes opening the bay doors 130 and 136 of the item consolidator 100 for imaging the content in a tray positioned below the item consolidator 100. As an example, the door controller 222 can direct the bay doors 130 and 136 to slide open laterally, as shown in FIG. 5A, so that the contents of the tray 22 can be examined using the imaging system 150. Particularly, the bay doors 130 and 136 can be extended apart and away from each other, so that the aperture through the support platform 110 is not covered or obstructed for the imaging system 150.

At step 302, the process includes the imaging system 150 and the image processor 224 mapping the content in the tray 22, to form a map of the content. That is, once the bay doors 130 and 136 are opened, the image processor 224 can direct the imaging system 150 to capture images of the content in the tray 22, such as the items 26-28 in FIG. 5A. The data captured by the imaging system 150 can be stored in the data store 210 for processing by the image processor 224. The image processor 224 can also perform a number of computer-based image and vision processing tasks using the data captured by the imaging system 150. For example, the image processor 224 can develop a map, such as a point cloud, representative of the items 26-28 contained in the tray 22. The map can identify the items 26-28, among other items contained within the tray 22, so that the item handling engine 220 can determine one or more suitable drop locations in the tray 22.

At step 304, the process includes the door controller 222 directing the drive systems 120 and 122 to form a bay door vertex between leading edges of the bay doors 130 and 136. For example, the bay doors 130 and 136 can be moved laterally into position close together, so that the leading edges of the bay doors 130 and 136 are located in close proximity to each other, with only a relatively small opening between them, as shown in FIGS. 5B, 6A, and 7A. The bay door vertex 170 is formed between the leading edges of the bay doors 130 and 136 when they are located in close proximity to each other. An angle "A" exists between the top surfaces of the bay doors 130 and 136 in this configuration as shown in FIG. 5B. As the door controller 222 continues to move and reposition the bay doors 130 and 136, the bay door vertex 170 can be repositioned. Items can be placed upon the bay doors 130 and 136 in this configuration.

At step 306, the process includes the item handling engine 220 determining a location to drop the item in the tray 22 based on the contents in the tray 22, with reference to the map of contents. The item handling engine 220 can determine a position to drop or place the item based on a number of factors, such as the positions other items in the tray 22, the size and shape of the item being dropped, and other factors and information. As examples, the item placement algorithms of the item handling engine 220 can be designed for an affinity to place items as low as possible within the tray 22, to spread or distribute items evenly within the tray 22, to avoid placing heavy items or large items upon smaller or more fragile items, or to account for other factors. A main objective of the item handling engine 220 can also be to avoid the placement of any item which would result in the item extending out or over the top lip of the tray 22.

At step 308, the process includes the door controller 222 directing the drive systems 120 and 122 to reposition the bay door vertex formed at step 304 based on the drop location determined at step 306. Referring to FIG. 5C for an example, assuming that the item handling engine 220 has determined to drop the item 180 to a position between the items 26 and 27, the door controller 222 can direct the drive systems 120 and 122 to laterally extend and angle the bay doors 130 and 136, as shown in FIG. 5D. The drive systems 120 and 122 can be coordinated to angle the bay doors 130 and 136 down, through angular motion of the bay doors 130 and 136, while at the same time extending the bay doors 130 and 136 laterally into the tray 22. In effect, this control lowers the item 180 down into the tray 22, and the bay door vertex 170 drops in position as shown. This motion can be preferable as compared to simply retracting or opening the bay doors 130 and 136 from the position shown in FIG. 5C, as a way to avoid damage to the item 180. As an alternative, the door controller 222 can direct the drive systems 120 and 122 to reposition the bay door vertex based on the examples described above with reference to FIG. 6B, FIG. 7B, or to other suitable locations according to the concepts described herein.

At step 310, the process can include opening the bay door vertex between the bay doors 130 and 136, to drop the item into the tray 22. For example, the item handling engine 220 can retract or open the bay doors 130 and 136, as shown in FIG. 5E, 6C, or 7C. The item consolidation methods described herein can offer certain advantages over other methods for item consolidation, such as faster speed, better item placement fidelity or accuracy, lower cost, and other benefits.

Figure 9:
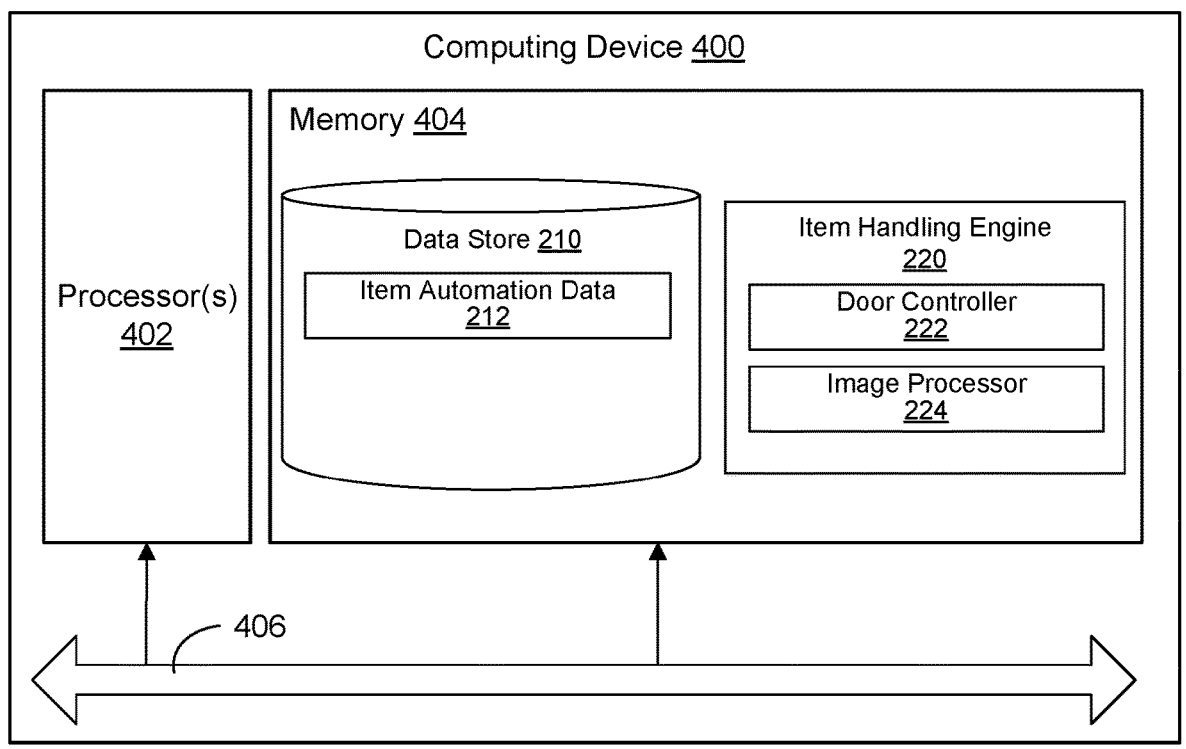
FIG. 9 illustrates an example computing device for the item consolidators according to various aspects of the embodiments of the present disclosure.

FIG. 9 illustrates an example computing device 400 for the item consolidator 100 according to various aspects of the embodiments of the present disclosure. The control environment 200, as shown in FIG. 2, can be implemented in the computing device 400, using hardware, software, or a combination of hardware and software. As shown in FIG. 6, the computing device 400 includes at least one processing system, for example, having a processor 402 and a memory 404, both of which are electrically and communicatively coupled to a local interface 406. The local interface 406 can be embodied as a data bus with an accompanying address/control bus or other addressing, control, and/or command lines, for data communications and addressing between the processor 402, the memory 404, the item consolidator 100, the sensors 160, and other peripherals and systems.

In various embodiments, the memory 404 stores the item automation data 212 and other software or executable-code components executable by the processor 402. The memory 404 can store data related to the operation of the item consolidator 100, the sensors 160, and other data in the data store 210. Among others, the executable-code components can include components associated with the item handling engine 220 and an operating system for execution by the processor 402. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

The memory 404 stores software for execution by the processor 402. In this respect, the terms "executable" or "for execution" refer to software forms that can ultimately be run or executed by the processor 402, whether in source, object, machine, or other form. Examples of executable programs include, for example, a compiled program that can be translated into a machine code format and loaded into a random access portion of the memory 404 and executed by the processor 402, source code that can be expressed in an object code format and loaded into a random access portion of the memory 404 and executed by the processor 402, or source code that can be interpreted by another executable program to generate instructions in a random access portion of the memory 404 and executed by the processor 402.

In various embodiments, the memory 404 can include both volatile and nonvolatile memory and data storage components. Volatile components are those that do not retain data values upon loss of power. Nonvolatile components are those that retain data upon a loss of power. Thus, the memory 404 can include, a random access memory (RAM), read-only memory (ROM), magnetic or other hard disk drive, solid-state or semiconductor memory, a universal serial bus (USB) flash drive, memory card, optical disc (e.g., compact disc (CD) or digital versatile disc (DVD)), floppy disk, magnetic tape, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device. An executable program can be stored in any portion or component of the memory 404.

The processor 402 can be embodied as one or more microprocessors, one or more discrete logic circuits having logic gates for implementing various logic functions, application specific integrated circuits (ASICs) having appropriate logic gates, and/or programmable logic devices (e.g., field-programmable gate array (FPGAs), and complex programmable logic devices (CPLDs)).

If embodied in software, the item handling engine 220 can represent a module or group of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. Thus, the processor 402 can be directed by execution of the program instructions to perform certain processes, such as those illustrated in FIG. 8. In the context of the present disclosure, a non-transitory computer-readable medium can be any tangible medium that can contain, store, or maintain any logic, application, software, or executable-code component described herein for use by or in connection with an instruction execution system.

Also, one or more of the components described herein that include software or program instructions can be embodied in a non-transitory computer-readable medium for use by or in connection with an instruction execution system, such as the processor 402. The computer-readable medium can contain, store, and/or maintain the software or program instructions for execution by or in connection with the instruction execution system. The computer-readable medium can include a physical media, such as, magnetic, optical, semiconductor, and/or other suitable media or drives. Further, any logic or component described herein can be implemented and structured in a variety of ways. For example, one or more components described can be implemented as modules or components of a single application. Further, one or more components described herein can be executed in one computing device or by using multiple computing devices.

The flowchart or process diagram in FIG. 8 is representative of certain processes, functionality, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 402. The machine code can be converted from the source code, etc. Further, each block can represent, or be connected with, a circuit or a number of interconnected circuits to implement a certain logical function or process step.

Although the flowchart or process diagram in FIG. 8 illustrates a specific order, it is understood that the order can differ from that which is depicted. For example, an order of execution of two or more blocks can be scrambled relative to the order shown. Also, two or more blocks shown in succession can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. Such variations, as understood for implementing the process consistent with the concepts described herein, are within the scope of the embodiments.

Although embodiments have been described herein in detail, the descriptions are by way of example. In other words, the embodiments of the frame described herein are not limited to frame structures for aircraft, however, and may be relied upon as frame structures for both airborne and ground-based crafts, vehicles, etc. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. A system for item consolidation, comprising:
a conveyor; and
an item consolidator positioned along the conveyor, the item consolidator comprising:
a first bay door and a second bay door;
a door displacement system, comprising:
a first drive system secured to an underside of the first bay door, the first drive system providing an angular and a lateral degree of freedom to the first bay door; and
a second drive system secured to an underside of the second bay door, the second drive system providing an angular and a lateral degree of freedom to the second bay door; and
a controller configured to:
direct the door displacement system to form a bay door vertex between leading edges of the first bay door and the second bay door;
determine a drop location for an item; and
direct the door displacement system to reposition the bay door vertex based on the drop location.

2. The system according to claim 1, wherein the controller is further configured to direct the door displacement system to open the bay door vertex, to allow the item to drop into a tray.

3. The system according to claim 1, wherein the controller is further configured to:
direct the door displacement system to spread the first bay door and the second bay door open; and
map content in a tray positioned under the item consolidator using an imaging system.

4. The system according to claim 1, wherein:
the first drive system comprises a first angular drive assembly and a first linear drive assembly secured to an underside of the first bay door; and
the second drive system comprises a second angular drive assembly and a second linear drive assembly secured to an underside of the second bay door.

5. An item consolidator, comprising:
a first bay door and a second bay door;
a door displacement system, comprising:
a first drive system secured to an underside of the first bay door; and
a second drive system secured to an underside of the second bay door; and
a controller configured to:
direct the door displacement system to form a bay door vertex between leading edges of the first bay door and the second bay door; and
determine a drop location for an item that is positioned over the first bay door and the second bay door with reference to a map of content in a tray.

6. The item consolidator according to claim 5, wherein the controller is further configured to:
direct the door displacement system to reposition the bay door vertex based on the drop location; and
open the bay door vertex, to allow the item to drop into the tray.

7. The item consolidator according to claim 5, wherein the controller is further configured to:
identify clearance at a bottom of a tray with reference to a map of content in the tray; and
determine that an item positioned over the first bay door and the second bay door can be positioned toward a bottom of a tray based on the clearance.

8. The item consolidator according to claim 7, wherein the controller is further configured to:
    direct the door displacement system to reposition the bay door vertex to the bottom of the tray; and
    open the bay door vertex, to place the item in the tray.

9. The item consolidator according to claim 5, wherein the controller is further configured to:
    direct the door displacement system to spread the first bay door and the second bay door open; and
    map content in a tray positioned under the item consolidator using an imaging system.

10. The item consolidator according to claim 5, wherein:
    the first drive system provides an angular and a lateral degree of freedom to the first bay door; and
    the second drive system provides an angular and a lateral degree of freedom to the second bay door.

11. The item consolidator according to claim 10, wherein the first drive system comprises an angular drive assembly and a linear drive assembly secured to an underside of the first bay door.

12. The item consolidator according to claim 11, wherein, in the first drive system, the angular drive assembly alters an angular orientation of the linear drive assembly.

13. The item consolidator according to claim 12, wherein the linear drive assembly comprises a rack gear secured to the underside of the first bay door and a rack drive engaged with the rack gear.

14. The item consolidator according to claim 5, further comprising a sensor system configured to provide position feedback signals for adjustment of a location of the bay door vertex.

15. A method of consolidating items, comprising:
    mapping content in a tray to form a map of the content;
    directing a door displacement system of an item consolidator to form a bay door vertex between leading edges of a first bay door and a second bay door of the item consolidator;
    determining a drop location for an item based on the map; and
    directing the door displacement system to reposition the bay door vertex based on the drop location.

16. The method of claim 15, further comprising opening the bay door vertex to drop the item into the tray.

17. The method of claim 15, further comprising, before the mapping, opening the bay doors for imaging the content in the tray.

18. The method of claim 15, wherein directing the door displacement system to reposition the bay door vertex comprises shifting the first bay door and the second bay door, together, to maintain the leading edges within a certain distance from each other.

19. The method of claim 15, wherein the door displacement system comprises an angular drive assembly and a linear drive assembly secured to an underside of the first bay door.

\* \* \* \* \*